Aug. 26, 1941.　　W. E. BETTENDORF　　2,254,099
BREAD SLICING MACHINE
Filed April 3, 1937　　4 Sheets-Sheet 1
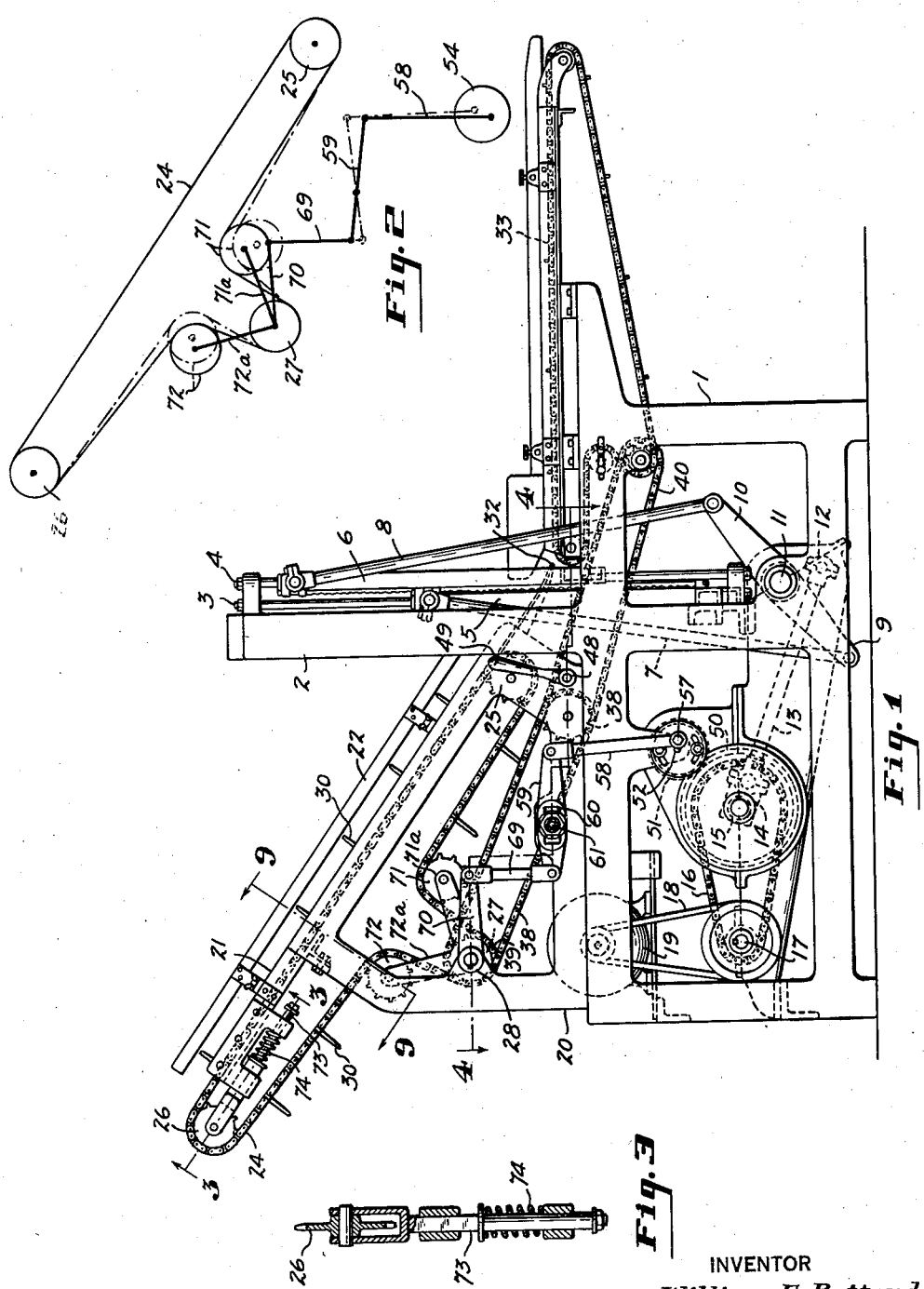
INVENTOR
*William E. Bettendorf*
BY
*Evans & McCoy*
ATTORNEYS Aug. 26, 1941.  W. E. BETTENDORF  2,254,099
BREAD SLICING MACHINE
Filed April 3, 1937   4 Sheets-Sheet 2
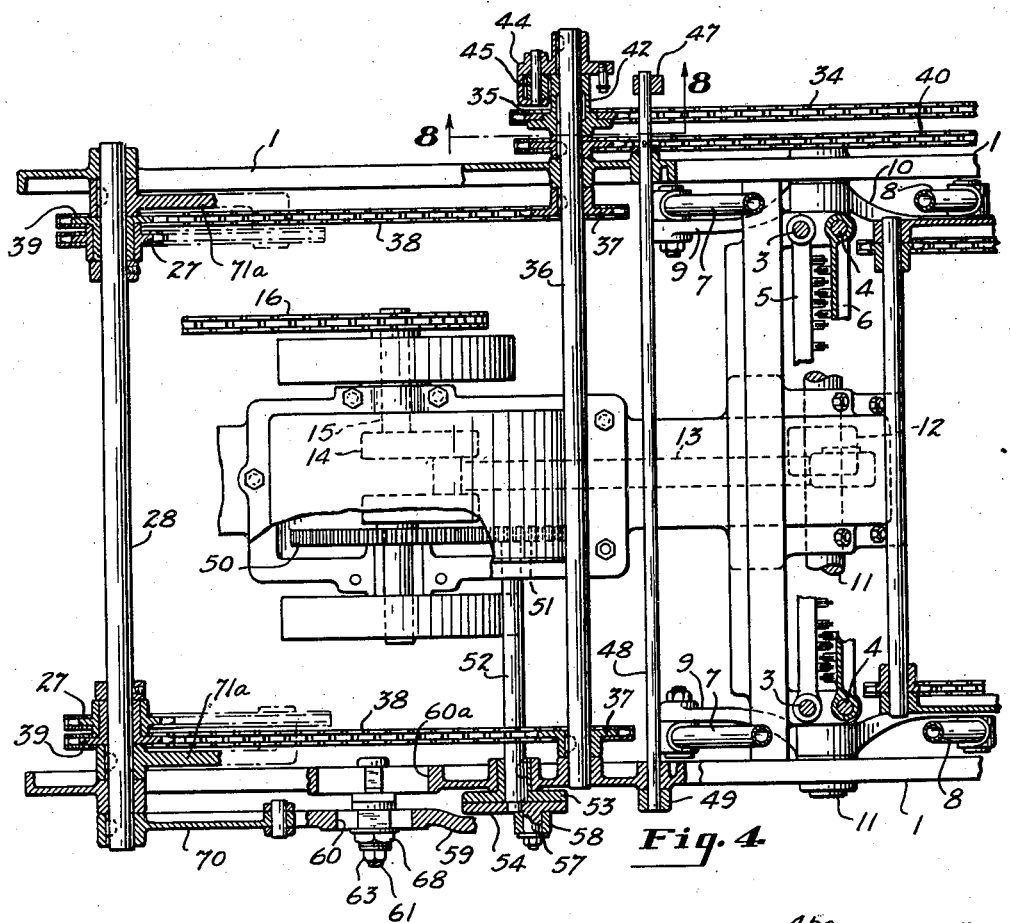
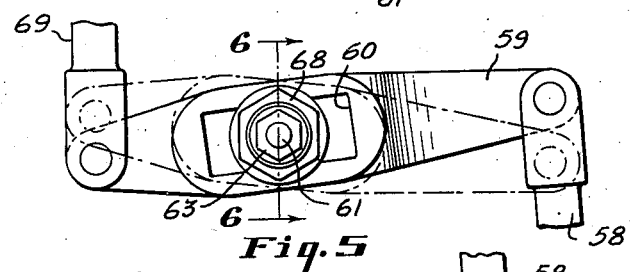
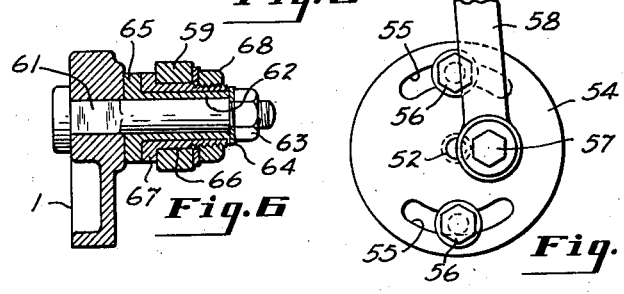
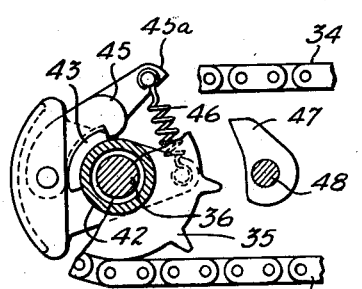
INVENTOR
William E. Bettendorf
BY
Evans & McCoy
ATTORNEYS

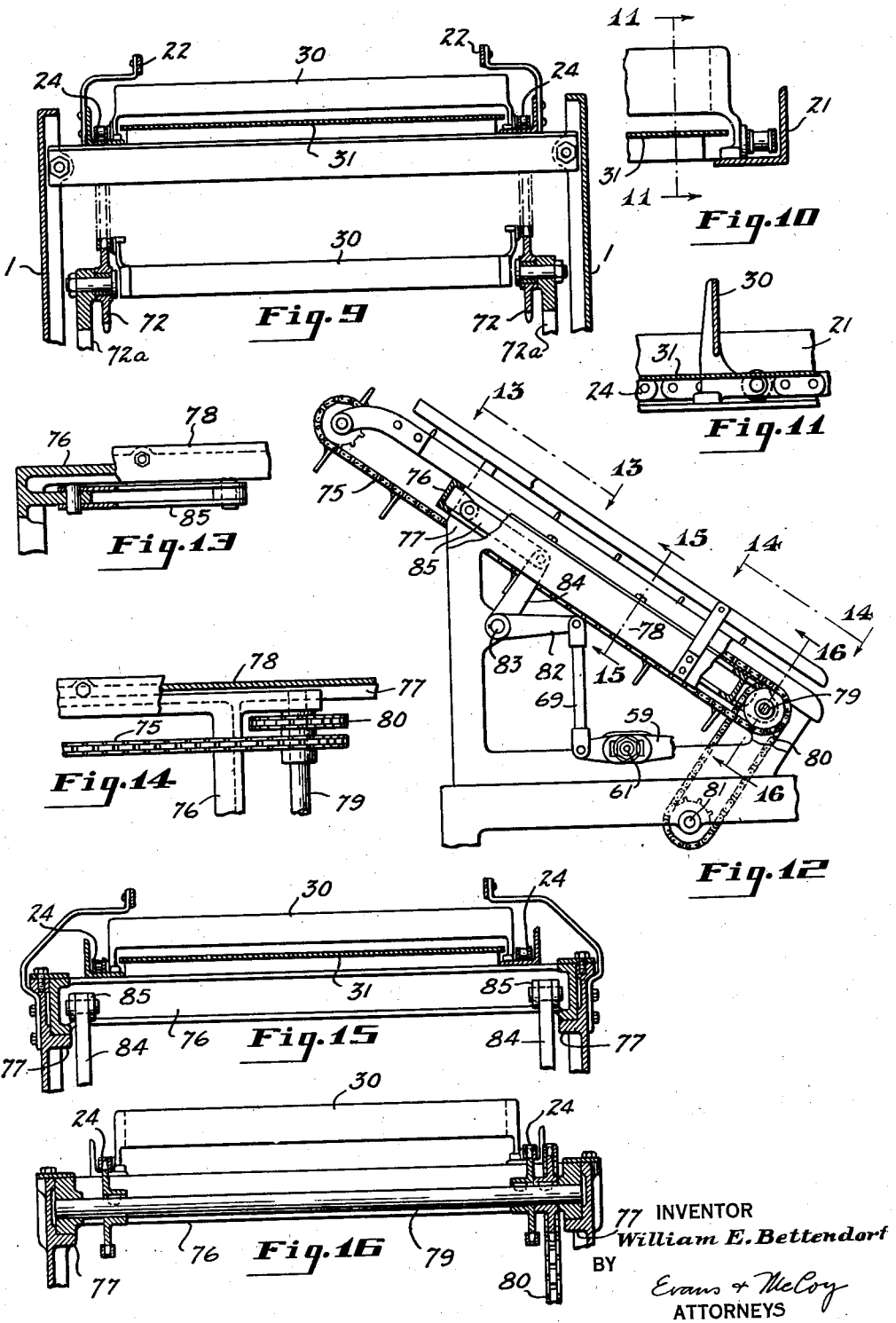

Aug. 26, 1941. W. E. BETTENDORF 2,254,099
BREAD SLICING MACHINE
Filed April 3, 1937 4 Sheets-Sheet 4

INVENTOR
William E. Bettendorf
BY Evans + McCoy
ATTORNEYS

Patented Aug. 26, 1941

2,254,099

UNITED STATES PATENT OFFICE 2,254,099

BREAD SLICING MACHINE

William E. Bettendorf, Davenport, Iowa, assignor to Micro-Westco, Inc., Bettendorf, Iowa, a corporation of Delaware Application April 3, 1937, Serial No. 134,793

18 Claims. (Cl. 146—153)

This invention relates to bread slicing machines and has for its object to provide a slicing machine of the reciprocating blade type adapted to deliver sliced loaves at a predetermined rate, in which the loaves are positively fed through the group of reciprocating blades, and in which the relative movement of the loaves with respect to the blades transversely thereof during the slicing operation is controlled in such a way that the pressure of the loaves against the blades is relieved during the intervals in which the blades are at the end of their stroke, and the pressure of the loaves against the blades is increased during the intervals in which the blades are moving at their highest speed.

Where the loaves of bread are fed directly from a slicing machine to a second machine, such as a wrapping machine, it is necessary to time the operation of the slicing machine with respect to the wrapping machine to deliver loaves at predetermined timed intervals. This necessitates the provision in the slicing machine of a positively driven conveyor mechanism geared to the wrapping machine so as to feed the loaves through the slicing blades in timed relation with the wrapping machine.

In slicing machines of the reciprocating blade, positively driven loaf feed type, such as heretofore used, there has been a noticeable unevenness in the cutting action of the blades, due to the fact that during the intervals in which the direction of movement of the blades is changing the loaves of bread are pressed by the feeding means, which moves at a constant rate, against blades which at times are substantially stationary and, therefore, momentarily inefficient for slicing. The blades cut most effectively while moving endwise at a rapid rate of speed between the ends of their stroke. The unevenness of the cutting action is indicated by the fact that waves or ripples are clearly discernible in slices produced in such a machine.

The present invention provides a means of so controlling the advance of the loaves relative to the group of knives that forward movements of the loaves with respect to the blades with which they are engaged are timed with respect to the reciprocating movements of the knives in such a manner as to cause substantially all of the cutting to take place during the portions of the blade stroke in which the blades are moving rapidly, thereby providing uniform cutting action and eliminating irregularities on the slice surfaces.

Important objects of the invention are to provide periodic variations in the rate of advancement of the loaves with respect to the blades of such a character and so timed as to provide maximum travel toward the blades at the times when the blades are moving at maximum speed, and to effect these variations without changing the production rate of the slicing machine.

A further object is to provide a device for controlling the advancement of the loaves relative to the blades during slicing which is adjustable to properly time the feed variations with respect to the variations in speed of the blades.

A further object is to provide a controlling device which is adjustable to increase or decrease the variations in the speed of advancement of the loaves with respect to the blades to compensate for changes in the speed of operation of the feeding means.

With the above and other objects in view the invention may be said to comprise the device as illustrated in the accompanying drawings, hereinafter described, and particularly set forth in the appended claims, together with such variations and modifications thereof as will be apparent to one skilled in the art to which the invention appertains.

Reference should be had to the accompanying drawings forming a part of this specification, in which—

Figure 1 is a side elevation of a machine embodying the invention;

Fig. 2 is a diagrammatic view showing the intermittently operated device for periodically shifting bread engaging portions of the feed conveyor;

Fig. 3 is a section taken on the line indicated at 3—3 in Fig. 1;

Fig. 4 is a section taken on the line indicated at 4—4 in Fig. 1;

Fig. 5 is a side elevation, on an enlarged scale, of a device for varying the throw of the oscillating feed controlling lever;

Fig. 6 is a section taken on the line indicated at 6—6 in Fig. 5;

Fig. 7 is a side elevation, on an enlarged scale, of the adjustable crank disk by means of which the feed controlling lever is oscillated;

Fig. 8 is a detail view showing the clutch for connecting the feed mechanism to and disconnecting the same from a driving element, which may be operated from a machine, such as a wrapping machine, to which the sliced loaves are delivered;

Fig. 9 is a section taken on the line indicated at 9—9 in Fig. 1;

Fig. 10 is a fragmentary transverse section through one of the conveyor chains and its supporting guide;

Fig. 11 is a section taken on the line indicated at 11—11 in Fig. 10;

Fig. 12 is a side elevation showing a slightly modified form of feed conveyor;

Fig. 13 is a section taken on the line indicated at 13—13 of Fig. 12;

Fig. 14 is a section taken on the line indicated at 14—14 of Fig. 12;

Fig. 15 is a section taken on the line indicated at 15—15 of Fig. 12;

Fig. 16 is a section taken on the line indicated at 16—16 of Fig. 12;

Figure 17:
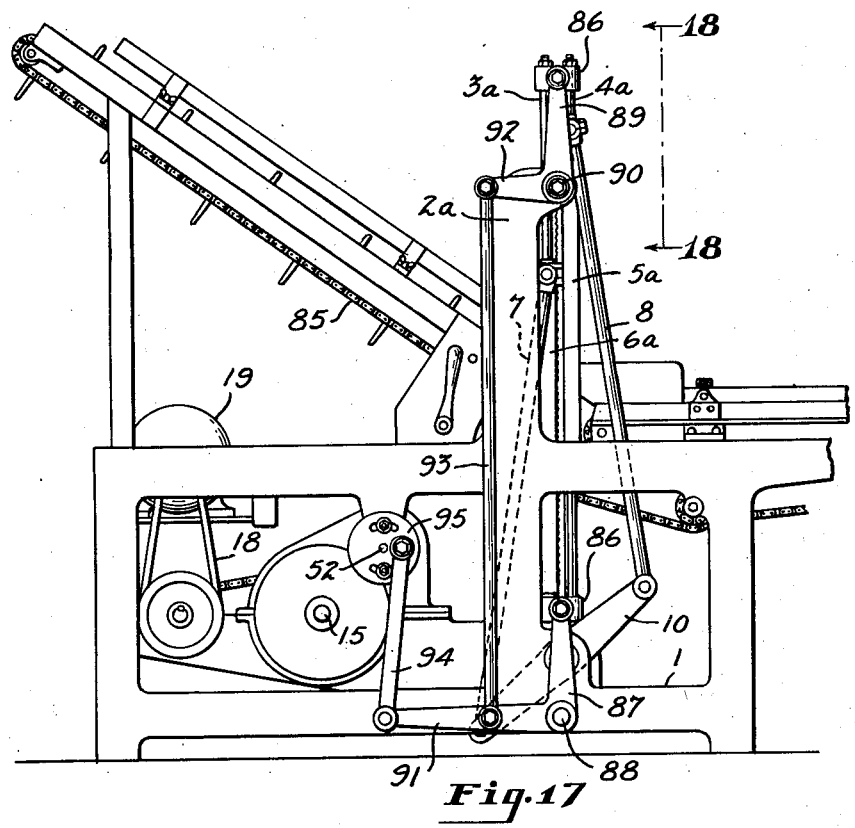
Fig. 17 is a side elevation showing a modified form of the invention in which the guide frame for the slicing blades is periodically shifted.
Figures 18, 19:
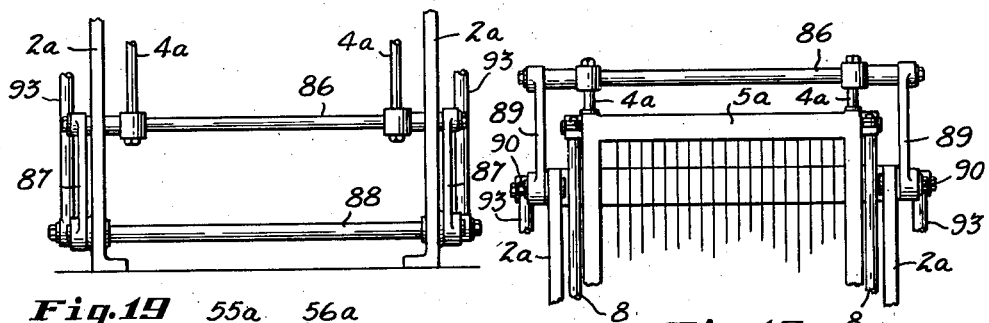
Fig. 18 is a fragmentary front elevation of the blade guide frame viewed as indicated at 18—18 in Fig. 17.
Fig. 19 is a fragmentary view showing the lower movable support for the guide frame.
Figure 20:
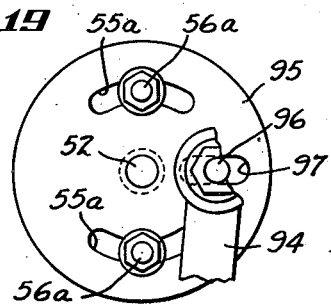
Fig. 20 is a side elevation of the crank disk through which the guide frame is periodically shifted.

In Figs. 1 to 11 the invention is shown applied to a slicing machine of the reciprocating blade type provided with endless conveyors for feeding loaves to and discharging loaves from the machine. The machine has a supporting frame 1 provided with laterally spaced standards 2 upon which are mounted pairs of vertical guide rods 3 and 4, guide rods 3 carrying a vertically movable blade frame 5 and guide rods 4 carrying a vertically movable blade frame 6. The blade frames 5 and 6 are of conventional construction, each carrying a series of laterally spaced, vertically disposed blades, the blades of one frame being interposed between the blades of the other.

Blade frames 5 and 6 are reciprocated on the guide rods 3 and 4 by means of connecting rods 7 and 8 which are connected to arms 9 and 10 extending oppositely from and fixed to a rock shaft 11. Means is provided for oscillating the rock shaft to impart an up and down movement to each of the blade frames which are connected to the connecting rods in such manner that one frame moves up while the other is moving down, as is common practice in bread slicing machines. The rock shaft 11 is provided with a crank arm 12 which is connected by a connecting rod 13 to a crank 14 on a crank shaft 15. Crank shaft 15 is continuously driven, and through the connecting rod 13 imparts an oscillating movement to the rock shaft 11. Shaft 15 is driven by a belt 16 extending from a countershaft 17, and a belt 18 extending from the countershaft 17 to the shaft of an electric motor 19.

As herein shown, the feed device in the form of an endless conveyor is mounted on an inclined frame 20 rearwardly of the standards 2. The upper run of the conveyor which advances the loaves to the slicer blades is inclined downwardly toward the slicing blades and is supported by angle guides 21 to which are attached guard rails 22 which guide the loaves during their forward movement. The feed conveyor comprises a pair of endless chains 24 which run over forward and rear end sprockets 25 and 26 and over a drive sprocket 27 on a cross shaft 28 which is offset downwardly with respect to the sprockets 25 and 26. The endless chains 24 carry loaf-engaging flights, which consist of arms 29 attached to links of the chains and cross bars 30 attached to transversely alined arms 29 on the two chains.

Between the guides 22 the frame is provided with a bed 31 upon which the loaves of bread slide during their movement to the slicing blades. At the discharge end of the conveyor a slotted plate 32 forms a continuation of the bed 31, through which the slicing blades extend, and supports the loaves during their passage through the group of blades. Forwardly of the slicing blades the frame carries an endless discharge conveyor 33, which receives the sliced loaves and delivers them at a desired distance from the slicer blades.

The feed and discharge conveyors are driven by suitable means, such as a drive chain 34, which may extend from the machine to which the sliced loaves are delivered by the slicing machine to properly time the delivery of sliced loaves to such machine. As shown in Fig. 4, the chain 34 runs over a sprocket 35 on a transverse shaft 36 journaled in the frame 1, to which are affixed sprockets 37 which drive chains 38 which extend over sprockets 39 fixed to the conveyor sprockets 27 and rotate therewith on the shaft 28. The discharge conveyor is driven by a chain 40 extending from sprockets on the shaft 36 to a sprocket on a cross shaft 41 which carries the driving sprockets of the discharge conveyor.

The operation of the feed and discharge conveyors is preferably controlled by a clutch which is designed to stop the feed conveyor in a position such that when the conveyors are stopped a completely sliced loaf will have passed through the slicing blades.

As shown in Figs. 4 and 8, the sprocket 35, which is rotatably mounted on the cross shaft 36, is provided with a laterally extending hub 42, which carries a radially projecting lug 43. The shaft 36 has affixed thereto at its outer end a disk 44, to the inner side of which is pivoted a pawl 45 which overlies the hub 42 of the sprocket 35. The pawl 45 is normally pressed inwardly toward the hub 42, toward a position in which it engages with the lug 43 by means of a coil spring 46, so that the pawl 45 normally engages the lug 43, causing the disk 44 and shaft 36 to rotate with the driven sprocket 35.

A trip arm 47 is mounted adjacent the clutch pawl on a shaft 48, to which is affixed a hand lever 49 (see Fig. 1). By means of the lever 49 the trip arm 47 may be swung toward the shaft 36 into the path of a projecting arm 45a fixed to the pawl 45, to disengage the pawl 45 from the lug 43 on the continuously rotating sprocket 35 and stop the rotation of the shaft 36 and the conveyors which are geared thereto.

The mechanism so far described is merely illustrative of one type of slicing machine to which the device of the present invention may be applied.

The present invention consists in the application to a machine, such as above described, of a mechanism continuously operated by the slicer blade operating means for periodically changing the rate at which the loaves are advanced with respect to the slicing blades in timed relation to the reciprocation of the blades so that the loaves will have a minimum speed of forward movement while the slicing blades are at the end of their stroke, and a maximum rate of forward movement while the blades are moving endwise at their highest speed.

It will be noted that the slicing blades and the feed conveyor have independent driving means so that the rate of forward movement of the loaves of bread may be varied while the speed of operation of the slicer blades remains constant.

In order to properly time the variations in the rate of advancement of the loaves with respect to the slicer blades with the reciprocating movements of the blades, the feed controlling means of the present invention is operated by the slicer driving mechanism. Also, the feed controlling means may be operated in a manner such that the production rate of the slicer will not be affected.

The controlling means is designed to effect two variations in the rate of movement of the load-engaging feed elements during each stroke of the slicer blades, one such variation accelerating the advancement of a loaf with respect to the blades and the other retarding the advancement of the loaf through the blades, thereby providing a maximum cutting action during one portion of each stroke of the blades and a minimum cutting action during another portion of the stroke.

It is to be understood that the term "stroke" as used herein means a movement of the blades in one direction, up or down.

As shown in Fig. 4 of the drawings, the crankshaft 15, which imparts motion to the slicing blades, has a gear 50 which meshes with a gear 51 of half its size, and which drives a shaft 52, to the inner end of which the gear 51 is fixed, at twice the speed of the crankshaft 15. At its outer end the shaft 52 has a disk 53 fixed thereto, upon which is adjustably mounted a crank plate 54 which, as shown in Figs. 1 and 7, is provided with arcuate slots 55 through which pass bolts 56, which are screwed into the disk. By means of the bolts 56 the crank plate may be adjusted to and secured in different angular positions with respect to the disk 53.

The crank plate 54 carries an eccentric crank pin 57 to which is attached a connecting rod 58, which connects the crank pin to one end of a lever 59 which is pivoted on the frame. As shown in Figs. 1, 5 and 6, the lever 59 is provided intermediate its ends with a longitudinal slot 60, which receives a pivot bolt 61 which is adjustably fixed to the frame of the machine in a slot 60ª. The bolt 61 carries a bushing 62 which is clamped against the frame by means of a nut 63 and washer 64 on the outer end of the bolt. The bushing 62 has a flange 65 which bears against the frame and has journaled thereon a sleeve 66 provided with a flange 67 which bears against the flange 65 of the bushing. The sleeve 66 extends through a slot 60 of the lever and has a threaded outer end which receives a nut 68, which clamps the lever 59 against the flange 67 of the sleeve and secures the lever against endwise movement on the pivot. By loosening the nut 68 the pivot bolt 61 can be adjusted in the slot 60 of the lever 59 to increase or decrease the length of the arm attached to the connecting rod 58 and to decrease or increase the throw of the opposite end of the arm. The end of the arm 59 opposite that to which the rod 58 is connected has a link 69 attached thereto, which is connected at its opposite end to an arm 70 which is fixed to the shaft 28, which carries the conveyor drive sprockets 27. Two guide sprockets 71 and 72, carried by arms 71a and 72a fixed to the shaft 28 adjacent each end thereof, engage the conveyor chains above and on opposite sides of the drive sprockets 27.

During the operation of the machine the crank operating the lever 59 makes two revolutions for each revolution of the blade-actuating crankshaft 15, and the lever 59 communicates two oscillations to the shaft 28. While the guide sprocket 71 is being moved upwardly by the lever 59 the upper run of the conveyor chain is pulled forwardly, the guide sprocket 72 moving downwardly at the same time that the sprocket 71 moves upwardly to allow sufficient slack in the chain to permit this forward movement. This motion of the guide sprockets causes the portion of the conveyor engaging with the loaves of bread to travel at speeds higher than that at which it is normally driven by the sprockets 27. This movement occurs during the portion of the revolution of the crank plate 54 in which the crank pin is moving downwardly. During the next half revolution of the crank plate 54 the connecting rod 58 is moving upwardly and the guide sprocket 72 is moved upwardly while the sprocket 71 moves downwardly. This causes reverse movement of the upper run of the conveyor with respect to the portion of the conveyor engaged by the driving sprocket, causing the forward travel of the loaf-engaging flights to be at speeds less than that at which they are normally driven. Thus the active portion of the feed conveyor which supports the flight which is advancing a loaf through the slicer blades is caused to have a periodically changing forward velocity, and these changes in velocity do not affect the number of loaves per minute which are fed through the slicing blades. The forward and backward movements imparted to the active portion of the conveyor independently of its uniformly operated driving mechanism are preferably equal. By adjusting the throw of the lever 59 the backward movement imparted to the conveyor flights during the upward movement of the guide sprocket 71 may be sufficient to cause the loaves of bread to come to a stop simultaneously with the reversal of movement of the slicer blades, at each end of their stroke. By means of its bolt and slot connection to the disk 53, the crank plate 54 may be adjusted to properly time the oscillations of the feed controlling device with respect to the stroke of the blade frame. The feed controlling device has two oscillations for each reciprocation of the slicer blades, and the crank plate 54 may be adjusted so that the maximum retardation of feed movement is at the ends of the strokes of the blades. With the device so adjusted, the maximum speed of advancement of the loaves with respect to the slicer blades will be at the center of each stroke of the blades, at which time the slicer blades are moving at their maximum speed, so that the actual cutting is done at the times when the blades are moving rapidly intermediate the ends of their stroke, that is, during the periods when the blades cut most effectively.

The speed at which the conveyor is driven may be changed from time to time, and as the speed is increased the lever 59 may be adjusted to increase the throw of the feed controlling lever, so as to provide greater acceleration and retardation of the feed to compensate for the increased speed at which the feed device is driven. In order to take up any back lash of the chains the rear sprocket 26 may be mounted on slide rods 73 and pressed outwardly by means of springs 74, so as to automatically take up any slack in the chain.

The present invention contemplates producing periodic variations in the speed of advancement of loaves through the slicer blades by gearing to the blade oscillating mechanism a mechanism for periodically imparting a relative movement between the support of the bread advancing member and the support of the slicing blades, the feed varying mechanism consisting of a device for imparting a reciprocating or oscillating motion to one of the supports and operating to impart to the support twice as many reciprocations or oscillations per minute as are imparted by the blade reciprocating mechanism to the blade frames, so that the slicing blades and feed element supports have a relative movement toward and away from each other during each stroke of the slicer blades.

In Figs. 12 to 16 of the drawings there is shown a modified form of the invention, in which the entire conveyor is moved bodily by the lever 59 and link 69 on each oscillation of the lever to vary the rate of forward movement of the loaves periodically and in timed relation to the strokes of the slicer blades. In this modification an endless conveyor 75 is mounted upon a frame 76, which is mounted to slide on inclined ways 77 on a fixed frame 78. The conveyor is driven through its forward sprocket shaft 79 by means of a chain 80 extending over a sprocket on a fixed shaft 81 journaled on the frame, chain 80 being of sufficient length to permit the necessary endwise bodily movement of the conveyor frame on the ways 77. To impart sliding movements to the conveyor frame, the link 69 is connected at its upper end to an arm 82 fixed to a rock shaft 83 journaled in the frame beneath the ways 77. The shaft 83 has arms 84 connected by links 85 to the frame 76 of the conveyor.

During each oscillation of the lever 59 the conveyor frame is given an endwise movement forwardly and rearwardly, accelerating and then retarding the movement of the flights carried by the conveyor, so that the forward movement of the loaves of bread through the slicer knives occurs during the intervals in which the slicer knives are moving at a rapid rate of speed. The retardation of the flights, due to the bodily rearward movement of the conveyor, causes the forward movement of the loaves to be substantially arrested at each end of the stroke of the slicer blades and to have a fairly rapid forward movement during the portions of the stroke of the slicer blades in which the blades have a rapid endwise movement, so that the cutting is effected during the portion of the stroke during which the blades cut most effectively.

In Figs. 17 to 20 of the drawings there is shown a modification of the invention in which the periodic changes in the rate of movement of the loaves through the slicer blades is effected by forward and rearward movements of the guide frame in which the slicer blades are mounted. The feed conveyor 85 is positively driven at a uniform speed by driving connections such as shown in connection with the modifications previously described. The vertical rods 3a and 4a which guide the reciprocating blade frames are mounted in a movable frame 86 which is supported at its lower end by arms 87 fixed at their lower ends to a cross shaft 88 journaled in the frame 1 and at its upper end by arms 89 fixed at their lower ends to stub shafts 90 journaled in the standards 2a. The blade frames 5a and 6a are reciprocated by means of the links 7 and 8, and rocker arms 10 actuated from the motor 19 by the connections shown in detail in Figs. 1 and 4. The shafts 88 and 90 have rearwardly extending arms 91 and 92 fixed thereto and the arms 87 are connected to the arms 89 by links 93 so that they move in unison. The lower arm 91 extend beyond the link 93 and is connected by a link 94 to a crank disk 95 on the shaft 52 which is geared to the shaft 15, as shown in Fig. 4, to rotate twice for each revolution of the shaft 15 and for each oscillation of the blade actuating arms 10.

The disk 95 is adjustable angularly on the shaft 52 by means of the slots 55a and bolts 56a to vary the timing of the oscillations of the guide frame supporting arms. The link 94 is adjustably connected to the disk 95 by means of a bolt 96 extending through a radial slot 97 in the disk so that the amplitude of oscillations of the guide frame supporting arms may be adjusted.

In Fig. 17 the upper blade frame is at the upper end of its stroke and the lower blade frame is at the lower end of its stroke, the guide frame supporting arms 87 and 89 are in substantially vertical position, and the arms 91 and 92 are in substantially horizontal position. The disk 95, rotating in a counter clockwise direction, will move the guide frame forwardly during the first quarter of the down stroke of the upper blade frame and of the up stroke of the lower blade frame, during the second and third quarters of the blade stroke the link 94 will be moving downwardly, and the guide frame 86 will move toward the feed conveyor 85. During the last quarter of the stroke the link 94 will be moving upwardly and the frame 86 will move forwardly in the direction of travel of the loaves. While the reciprocating slicer blades are changing their direction of movement of either end of their stroke, the slicer blades are moved bodily in the direction of loaf feed after the blade frames have acquired some velocity of movement, the direction of movement of the slicer guide frame is reversed. and during the half of the stroke of the slicer blades in which they are traveling at the greatest speed the movement of the guide frame is opposite that of the loaves being sliced.

It will be apparent that various mechanical equivalents of the crank and lever mechanism herein shown may be employed to effect the desired periodic relative movements of the feed element and cutter blade supports.

It will be apparent that the present invention provides a simple and inexpensive device for properly correlating the movements of the feed mechanism with the reciprocating movements of the knives to effect the slicing of bread in the most advantageous manner, enabling the knives to move transversely through the loaves at the highest rate of speed during the portions of their stroke in which they cut most effectively, and retarding the relative feed of the bread during the portion of the stroke in which the endwise movement of the blades is slow, the intermittent variations in speed of travel of the loaves being effected without changing the output of the slicing machine, which is determined by the speed of the conveyor driving mechanism.

Although only two embodiments of the invention have been herein shown and described, it will be understood that numerous modifications of the construction shown may be resorted to without departing from the spirit of this invention, as defined in the appended claims.

What I claim is:

1. A bread slicing machine comprising a frame, a group of parallel laterally spaced blades mounted in the frame for endwise movement, means for simultaneously reciprocating said blades, a feed device for advancing loaves of bread to and through the group of blades, means independent of the blade reciprocating means for actuating said feed device, and means controlled by the blade reciprocating means for accelerating and retarding the feed device during each endwise movement of the blades.

2. A bread slicing machine comprising a frame, a group of parallel laterally spaced blades mounted for endwise movement in the frame, means for reciprocating said blades simultaneously, an endless conveyor for advancing loaves of bread transversely to and through the group of blades, a drive shaft operating at a uniform speed geared to said conveyor, and means controlled by the blade reciprocating means for alternately accelerating and retarding the movement of the bread engaging portion of the conveyor during each endwise movement of the blades.

3. A bread slicing machine comprising a frame, a group of parallel laterally spaced blades mounted for endwise movement in the frame, means for reciprocating said blades simultaneously, an endless conveyor for advancing loaves of bread transversely to and through the group of blades, a drive shaft geared to said conveyor operating at a uniform speed, and a device geared to the blade reciprocating means and operatively connected with the conveyor for alternately causing the bread engaging portion of the conveyor to advance and recede relatively to the conveyor drive shaft to accelerate and retard the forward motion of the bread in timed relation to the reciprocating movements of the blades and during each endwise movement of the blades.

4. In a bread slicing machine, a frame, a group of parallel laterally spaced blades mounted for endwise movement in the frame, means including a crank shaft for reciprocating said blades, an endless conveyor for feeding loaves of bread transversely to and through the group of blades, means including a drive shaft driven independently of said crank shaft for driving said conveyor, and means operated by said crank shaft for imparting movements to bread engaging portions of the conveyor to alternately accelerate and retard the speed of movement of the bread passing through the group of blades during each endwise movement of the blades.

5. In a bread slicing machine, a frame, a group of parallel laterally spaced blades mounted for endwise movement in the frame, means including a crank shaft for reciprocating said blades, an endless conveyor for feeding loaves of bread transversely to and through the group of blades, means including a drive shaft driven independently of said crank shaft for driving said conveyor, a second crank shaft geared to the first to rotate at twice the speed of the first, and means operatively connecting the second crank shaft to bread engaging portions of the conveyor to move the same alternately toward and away from the blades to accelerate and retard the forward movement of the loaves.

6. In a bread slicing machine, a frame, a group of parallel laterally spaced blades mounted for endwise movement in the frame, means including a crank shaft for reciprocating said blades, an endless conveyor for feeding loaves of bread transversely to and through the group of blades, means including a drive shaft driven independently of said crank shaft for driving said conveyor, a second crank shaft driven by the first, and means operated by said second crank shaft for alternately increasing and decreasing the rate of movement of the bread through the group of blades in timed relation to the reciprocation of the blades and during each endwise movement of the blades.

7. A bread slicing machine comprising a frame, a group of parallel laterally spaced blades mounted for endwise movement in the frame, a driven shaft and means connecting said shaft to said blades to reciprocate the blades simultaneously, means for feeding loaves of bread transversely to and through the group of blades, means independent of said driven shaft for actuating said feeding means to advance the loaves at a predetermined rate, and a mechanism geared to said driven shaft for effecting relative movements of the feeding means and blades in the direction of feed to alternately accelerate and retard the speed of transverse movement of loaves in engagement with the blades relative to the group of blades during each endwise movement of the blades.

8. A bread slicing machine comprising a frame, a group of parallel laterally spaced blades mounted for endwise movement in the frame, a driven shaft and means connecting said shaft to said blades to reciprocate the blades simultaneously, means for feeding loaves of bread transversely to and through the group of blades, means independent of said driven shaft for actuating said feeding means to advance the loaves at a predetermined rate, supports for said feeding means and for said group of blades which are relatively movable in the direction of the feed of the loaves, and mechanism operated by said driven shaft for moving one of said supports alternately toward and away from the other at intervals timed with respect to the reciprocating movements of the blades and during each endwise movement of the blades.

9. A broad slicing machine comprising a frame, a group of parallel laterally spaced blades mounted for endwise movement in the frame, a driven shaft and means connecting said shaft to said blades to reciprocate the blades simultaneously, means for feeding loaves of bread transversely to and through the group of blades, means independent of said driven shaft for actuating said feeding means to advance the loaves at a predetermined rate, supports for said feeding means and for said group of blades which are relatively movable in the direction of the feed of the loaves, mechanism operated by said driven shaft for moving one of said supports alternately toward and away from the other at intervals timed with respect to the reciprocating movements of the blades and during each endwise movement of the blades, and means for adjusting said mechanism to vary the timing of the support movements with respect to the movements of the blades.

10. A bread slicing machine comprising a frame, a group of parallel laterally spaced blades mounted for endwise movement in the frame, a driven shaft and means connecting said shaft to said blades to reciprocate the blades simultaneously, means for feeding loaves of bread transversely to and through the group of blades, means independent of said driven shaft for actuating said feeding means to advance the loaves at a predetermined rate, supports for said feeding means and for said group of blades which are relatively movable in the direction of the feed of the loaves, mechanism operated by said driven shaft for moving one of said supports alternately toward and away from the other at intervals timed with respect to the reciprocating movements of the blades and during each endwise movement of the blades, and means for varying the amplitude of movement of the support so moved.

11. A bread slicing machine comprising a frame, a group of parallel laterally spaced blades mounted for endwise movement in the frame, a driven shaft and means connecting said shaft to said blades to reciprocate the blades simultaneously, means for feeding loaves of bread transversely to and through the group of blades, means independent of said driven shaft for actuating said feeding means to advance the loaves at a predetermined rate, supports for said feeding means and for said group of blades which are relatively movable in the direction of the feed of the loaves, and mechanism including a shaft driven from the driven shaft at twice the speed of said driven shaft, and connections from said shaft to one of said supports for moving the same toward or away from the other support to accelerate or retard the speed of movement of loaves with respect to the blades during their passage through the group of blades.

12. A bread slicing machine comprising a frame, a group of laterally spaced parallel blades mounted for endwise movement in the frame, a conveyor for feeding loaves of bread transversely to and through the group of blades, means for driving the conveyor, means for reciprocating the blades simultaneously, and means for shifting a bread engaging portion of the conveyor alternately forward and back in the direction of movement of the loaves twice during each reciprocation of the blades.

13. A bread slicing machine comprising a frame, a group of laterally spaced parallel blades mounted for endwise movement in the frame, a conveyor for feeding loaves of bread transversely to and through the group of blades, supports for the conveyor and for the group of blades which are relatively movable in the direction of feed of the loaves, means for reciprocating the blades, and means for moving one of said supports forward and back during each endwise movement of the blades.

14. A bread slicing machine comprising a frame, a group of laterally spaced parallel blades mounted for endwise movement in the frame, a conveyor for feeding loaves of bread transversely to and through the group of blades, supports for the conveyor and for the group of blades which are relatively movable in the direction of feed of the loaves, means for reciprocating the blades, means for moving one of said supports forward and back during each endwise movement of the blades, and means for varying the amplitude of movement of the movable support.

15. A bread slicing machine comprising a frame, a group of laterally spaced parallel blades mounted for endwise movement in the frame, a conveyor for feeding loaves of bread transversely to and through the group of blades, means for driving the conveyor, means for reciprocating the blades simultaneously, means for shifting a bread engaging portion of the conveyor alternately forward and back in the direction of movement of the loaves during each endwise movement of the blades, and means for varying the amplitude of shifting movement imparted to the said bread engaging portion.

16. A bread slicing machine comprising a frame, a group of laterally spaced parallel blades mounted for endwise movement in the frame, a conveyor for feeding loaves of bread transversely to and through the group of blades, means for driving the conveyor, means for reciprocating the blades simultaneously, means for shifting a bread engaging portion of the conveyor alternately forward and back in the direction of movement of the loaves during each endwise movement of the blades, and means for varying the timing of the shifting movements of the bread engaging portion with respect to the movements of the blades.

17. A bread slicing machine comprising a frame, a group of laterally spaced parallel blades mounted for endwise movement in the frame, a conveyor for feeding loaves of bread transversely to and through the group of blades, supports for the conveyor and for the group of blades which are relatively movable in the direction of feed of the loaves, means for reciprocating the blades, and means for moving the blade support in the direction of the loaf feed during the beginning of each endwise movement of the blades, in a direction opposite that of the loaf feed during the intermediate portion of the endwise movement of the blades and again in the direction of loaf feed during the final portion of each endwise movement of the blades.

18. In a slicing machine for operating on compressible loaves, such as bread loaves and the like, a slicing device including two sets of straight elongated knife blades, mechanism for reciprocating said sets longitudinally of said blades simultaneously in opposite directions approximately lengthwise of the blades with a harmonic motion such that the movement of the blades varies from a minimum at the beginning of each reciprocation to a maximum at the mid portion of the reciprocation, bread loaf feeding means for engaging and forwarding a continuous series of loaves in side-by-side contacting relation through said blades, and means coacting with said blade reciprocating mechanism and said loaf feeding means, and synchronized with the reciprocations of said blades, to produce a feeding movement of said loaves with respect to the blades which is varied during each of said reciprocations in time with respect to the reciprocations to provide maximum speed of feeding movement during the time of maximum speed of reciprocation and consequent maximum slicing effectiveness of the blades, and to produce a minimum feeding effect of the loaves relative to the blades when the speed of reciprocation of said blades is at a minimum with consequent minimum slicing effectiveness of the blades.

WILLIAM E. BETTENDORF.